(12) United States Patent
Hahm et al.

(10) Patent No.: US 12,610,429 B2
(45) Date of Patent: Apr. 21, 2026

(54) ELECTRONIC APPARATUS, USER TERMINAL DEVICE FOR RE-PERFORMING EASY SETUP AND CONTROL METHODS THEREOF

(71) Applicant: SAMSUNG ELECTRONICS CO., LTD., Suwon-si (KR)

(72) Inventors: Seongil Hahm, Suwon-si (KR); Jinhwan Kim, Suwon-si (KR); Hyunsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 18/216,121

(22) Filed: Jun. 29, 2023

(65) Prior Publication Data

US 2024/0073993 A1     Feb. 29, 2024

Related U.S. Application Data

(63) Continuation of application No. PCT/KR2023/007485, filed on Jun. 1, 2023.

(30) Foreign Application Priority Data

Aug. 30, 2022     (KR) ........................ 10-2022-0109389

(51) Int. Cl.
| | |
|---|---|
| *H04W 76/30* | (2018.01) |
| *H04W 8/00* | (2009.01) |
| *H04W 76/19* | (2018.01) |

(52) U.S. Cl.
CPC ........... *H04W 76/30* (2018.02); *H04W 8/005* (2013.01); *H04W 76/19* (2018.02)

(58) Field of Classification Search
CPC ....... G16Y 20/20; H04L 12/28; H04W 12/06; H04W 4/06; H04W 4/50; H04W 4/80; H04W 48/16; H04W 60/00
See application file for complete search history.

(56) References Cited

U.S. PATENT DOCUMENTS 9,615,312 B2     4/2017  Lee et al.
9,930,708 B2     3/2018  Kang et al.
(Continued)

FOREIGN PATENT DOCUMENTS

| CN | 104768153 B | * | 9/2018 | ............ H04W 12/06 |
|---|---|---|---|---|
| EP | 4 250 685 A1 | | 9/2023 | |
(Continued)

OTHER PUBLICATIONS

International Search Report dated Sep. 15, 2023 issued by the International Searching Authority in International Application No. PCT/KR2023/007485 (PCT/ISA/210).
(Continued)

*Primary Examiner* — Zhensheng Zhang
(74) *Attorney, Agent, or Firm* — Sughrue Mion, PLLC

(57)     ABSTRACT

An electronic apparatus includes at least one communication interface; and at least one processor operatively coupled with the at least one communication interface and configured to control the electronic apparatus, wherein the processor may be further configured to: based on a release of a communication connection with a first access point, control the at least one communication interface to perform scanning for rejoining with the first access point, and based on reception of a signal including identification information of the electronic apparatus from a user terminal device through the at least one communication interface, control the at least one communication interface to operate as a second access point.

8 Claims, 10 Drawing Sheets

(56) References Cited

U.S. PATENT DOCUMENTS

| | | | |
|---|---|---|---|
| 9,961,484 B2 | 5/2018 | Choi et al. | |
| 10,117,278 B2 | 10/2018 | Lee et al. | |
| 10,506,129 B2 | 12/2019 | Terashita et al. | |
| 10,785,104 B1 | 9/2020 | Maloney et al. | |
| 11,452,159 B2 | 9/2022 | Kim et al. | |
| 2010/0165879 A1 | 7/2010 | Gupta et al. | |
| 2013/0058310 A1* | 3/2013 | Park | H04W 72/541 |
| | | | 370/329 |
| 2015/0071052 A1 | 3/2015 | Hershberg et al. | |
| 2015/0109897 A1 | 4/2015 | Lee et al. | |
| 2017/0208641 A1 | 7/2017 | Lee et al. | |
| 2017/0353981 A1 | 12/2017 | Lee et al. | |
| 2018/0102583 A1* | 4/2018 | Trani | H01Q 21/065 |
| 2019/0116087 A1 | 4/2019 | Hiller | |
| 2020/0186604 A1 | 6/2020 | Park | |
| 2021/0153283 A1 | 5/2021 | Kim et al. | |
| 2021/0176809 A1 | 6/2021 | Fan et al. | |
| 2021/0219359 A1* | 7/2021 | Lubenski | H04L 61/5007 |

FOREIGN PATENT DOCUMENTS

| | | | |
|---|---|---|---|
| JP | 2018-180978 | A | 11/2018 |
| KR | 10-2015-0114845 | A | 10/2015 |
| KR | 10-1574767 | B1 | 12/2015 |
| KR | 10-1997938 | B1 | 7/2019 |
| KR | 10-2144046 | B1 | 8/2020 |
| KR | 10-2021-0060111 | A | 5/2021 |
| KR | 10-2415207 | B1 | 6/2022 |
| WO | 2022/105028 | A1 | 5/2022 |

OTHER PUBLICATIONS

International Written Opinion dated Sep. 15, 2023 issued by the International Searching Authority in International Application No. PCT/KR2023/007485 (PCT/ISA/237).

Communication issued on Jul. 29, 2025 by the European Patent Office for European Patent Application No. 23860604.0.

\* cited by examiner

Figure 5:
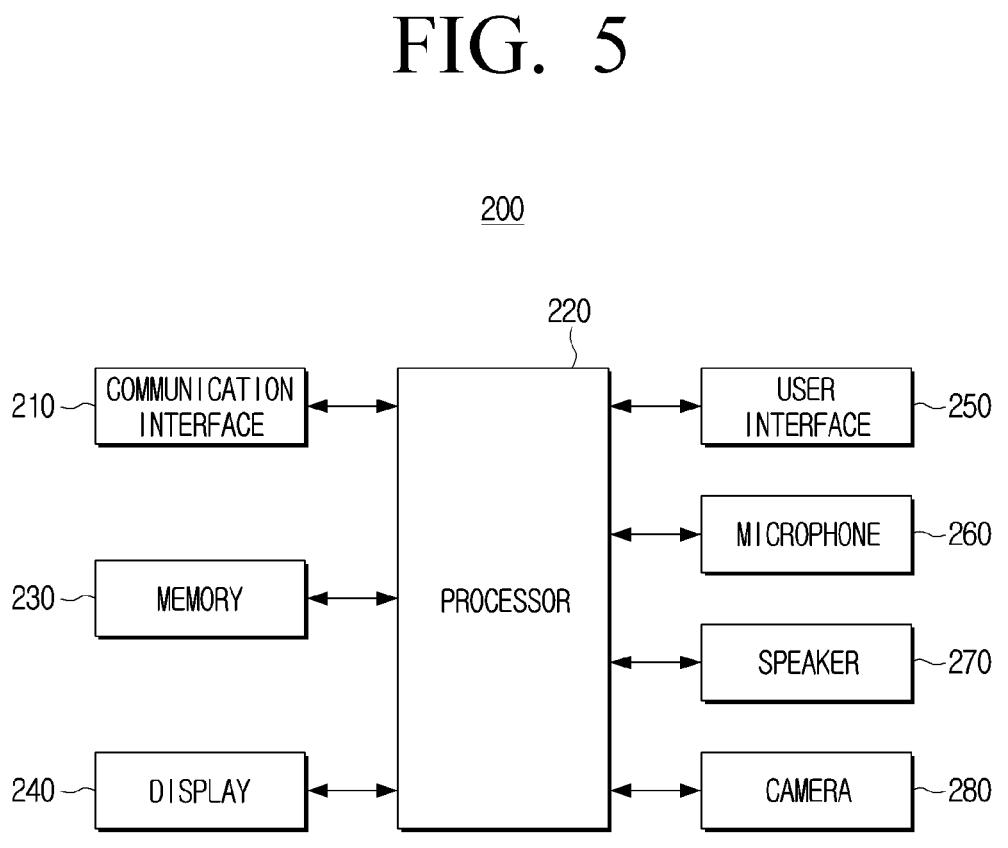

210 COMMUNICATION INTERFACE

230 MEMORY

240 DISPLAY

PROCESSOR

USER INTERFACE 250

MICROPHONE 260

SPEAKER 270

CAMERA 280

Figure 6:
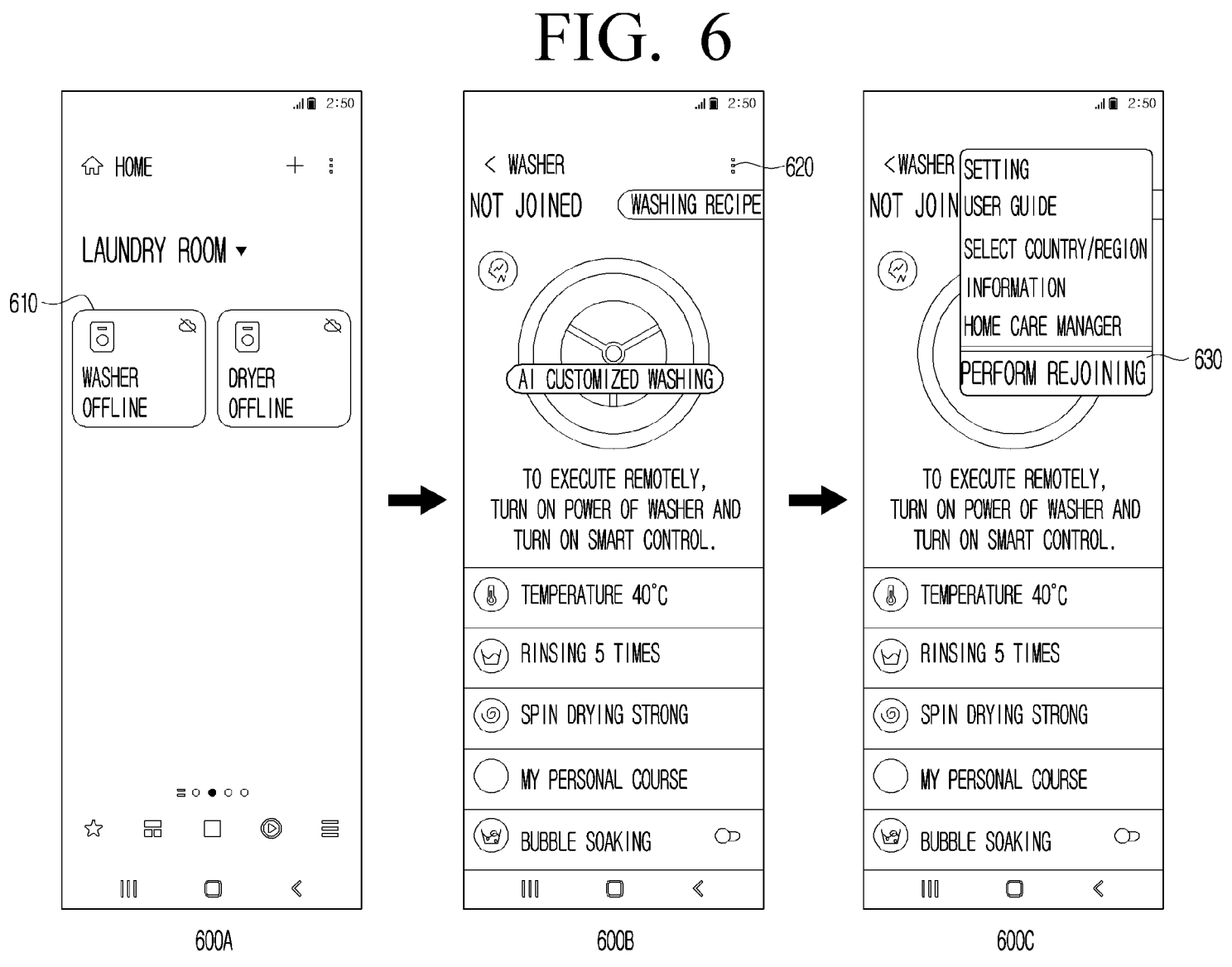

⬅ HOME　　　+　　　⋯

LAUNDRY ROOM ▶

WASHER
OFFLINE　　　DRYER
OFFLINE

☆　　Ⅲ　　◫　　○　　⬠　　◻　　∨　　Ⅲ

610

600B

2:50

< WASHER　　　　　WASHING RECIPE

NOT JOINED

AI CUSTOMIZED WASHING

TO EXECUTE REMOTELY,
TURN ON POWER OF WASHER AND
TURN ON SMART CONTROL.

TEMPERATURE 40°C

RINSING 5 TIMES

SPIN DRYING STRONG

MY PERSONAL COURSE

BUBBLE SOAKING

Ⅲ　　◻　　∨

620

600C

.ıl 🔋 2:50

<WASHER SETTING

NOT JOIN USER GUIDE

SELECT COUNTRY/REGION
INFORMATION

HOME CARE MANAGER

PERFORM REJOINING

TO EXECUTE REMOTELY,
TURN ON POWER OF WASHER AND
TURN ON SMART CONTROL.

TEMPERATURE 40°C

RINSING 5 TIMES

SPIN DRYING STRONG

MY PERSONAL COURSE

BUBBLE SOAKING

Ⅲ　　◻　　∨

630

ELECTRONIC APPARATUS, USER TERMINAL DEVICE FOR RE-PERFORMING EASY SETUP AND CONTROL METHODS THEREOF

CROSS-REFERENCE TO RELATED APPLICATIONS

This application is a continuation of PCT/KR2023/007485, filed on Jun. 1, 2023, at the Korean Intellectual Property Receiving Office and claims priority under 35 U.S.C. § 119 to Korean Patent Application No. 10-2022-0109389, filed on Aug. 30, 2022 at the Korean Intellectual Property Office, the disclosures of each which are incorporated by reference herein in their entireties.

BACKGROUND

1. Field

The disclosure relates to an electronic apparatus, a user terminal device, and control methods thereof, and more particularly, to an electronic apparatus and a user terminal device that re-performs an Easy Setup operation and control methods thereof.

2. Description of Related Art

With developments in electronic technology, electronic apparatuses of various types are being developed. Recently, as internet of things (IoT) devices are being supplied, there is improvement to user convenience in operation of electronic apparatuses.

However, because most IoT devices are not provided with displays, there is difficulty in delivering information to users. For example, there is a problem of users joining IoT devices to the internet.

The problems as described above may be solved through a smartphone. Specifically, a process of the IoT devices being joined to the internet while concurrently being registered in an IoT server may be achieved through a method of mediating by a smartphone. The method described above may be referred to as an Easy Setup operation, onboarding, or commissioning. However, these solutions are time consuming and inconvenient. For example, re-performing the Easy Setup operation is difficult for the user because the user has no knowledge of the series of operations required to perform the Easy Setup operation.

SUMMARY

According to an aspect of the disclosure, an electronic apparatus includes: at least one communication interface; and at least one processor operatively coupled with the at least one communication interface and configured to control the electronic apparatus, wherein the processor may be further configured to: based on a release of a communication connection with a first access point, control the at least one communication interface to perform scanning for rejoining with the first access point, and based on reception of a signal including identification information of the electronic apparatus from a user terminal device through the at least one communication interface, control the at least one communication interface to operate as a second access point.

The at least one processor may be further configured to, after the first access point is released: receive information about the first access point from the user terminal device through the at least one communication interface, and control the at least one communication interface to transmit a rejoining request to the first access point based on the information about the first access point.

The at least one processor may be further configured to, after the first access point is released: receive a broadcasted Wi-Fi beacon frame or Bluetooth Low Energy (BLE) advertising packet from the user terminal device through the at least one communication interface, and based on the Wi-Fi beacon frame or the BLE advertising packet including the identification information of the electronic apparatus, control the at least one communication interface to operate as the second access point.

According to an aspect of the disclosure, a user terminal device includes: at least one communication interface; and at least one processor operatively coupled with the at least one communication interface and configured to control the user terminal device, wherein the at least one processor may be further configured to: based on identifying that a communication connection between an electronic apparatus and a first access point is released, control the at least one communication interface to perform broadcasting of a signal including identification information of the electronic apparatus, and based on the electronic apparatus operating as a second access point, control the at least one communication interface to transmit information about the first access point to the electronic apparatus.

The at least one processor may be further configured, after identifying that the communication connection is released: control the at least one communication interface to perform broadcasting of the signal for a threshold time, and identify whether the electronic apparatus is operated as the second access point when the threshold time is passed.

The at least one processor may be further configured to, after identifying that the communication connection is released: based on the electronic apparatus operating as the second access point, transmit information about the first access point to the electronic apparatus, and based on the electronic apparatus not operating as the second access point, control the at least one communication interface to re-perform broadcasting of the signal.

The at least one processor may be further configured to, based on identifying that the communication connection between the electronic apparatus and the first access point is released, control the at least one communication interface to perform broadcasting of a Wi-Fi beacon frame or a Bluetooth Low Energy (BLE) advertising packet including the identification information of the electronic apparatus.

The user terminal device may further include: a memory, wherein the at least one processor may be further configured to: obtain the identification information of the electronic apparatus while performing an Easy Setup operation for the communication connection, store the identification information of the electronic apparatus in the memory, and based on identifying that the communication connection between the electronic apparatus and the first access point is released, control the at least one communication interface to perform broadcasting of the signal including the identification information of the electronic apparatus stored in the memory.

The user terminal device may further include: a display; and a user interface, wherein the at least one processor may be further configured to: based on identifying that the communication connection of the electronic apparatus and the first access point is released, control the display to display a message indicating that the communication connection has been released, and based on reception of a user command for rejoining the electronic apparatus to the first access point through the user interface, control the at least one communication interface to perform broadcasting of the signal including the identification information of the electronic apparatus.

The at least one processor may be further configured to, after identifying that the communication connection is released, identify a communication connection state of the electronic apparatus and an access point when a pre-set application is executed or at pre-set time intervals.

According to an aspect of the disclosure, a control method of an electronic apparatus, the control method including: based on a release of a communication connection with a first access point, performing scanning for rejoining with the first access point; and based on reception of a signal including identification information of the electronic apparatus from a user terminal device, operating as a second access point.

The control method may further include, after the first access point is released: receiving information about the first access point from the user terminal device; and transmitting a rejoining request to the first access point based on the information about the first access point.

The operating as the second access point may include: receiving a broadcasted Wi-Fi beacon frame or Bluetooth Low Energy (BLE) advertising packet from the user terminal device, and based on the Wi-Fi beacon frame or the BLE advertising packet including the identification information of the electronic apparatus, operating as the second access point.

According to an aspect of the disclosure, control method of a user terminal device, the control method including: based on a identifying that a communication connection between an electronic apparatus and a first access point is released, performing broadcasting of a signal including identification information of the electronic apparatus; and based on the electronic apparatus operating as a second access point, transmitting information about the first access point to the electronic apparatus.

The performing broadcasting may include: performing broadcasting of the signal for a threshold time, and identifying whether the electronic apparatus is operated as the second access point based on the threshold time passing.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a block diagram illustrating a detailed configuration of a user terminal device according to one or more embodiments;

FIG. 6 is a diagram illustrating a screen of an application that manages IoT devices according to one or more embodiments;

DETAILED DESCRIPTION

Figure 1:
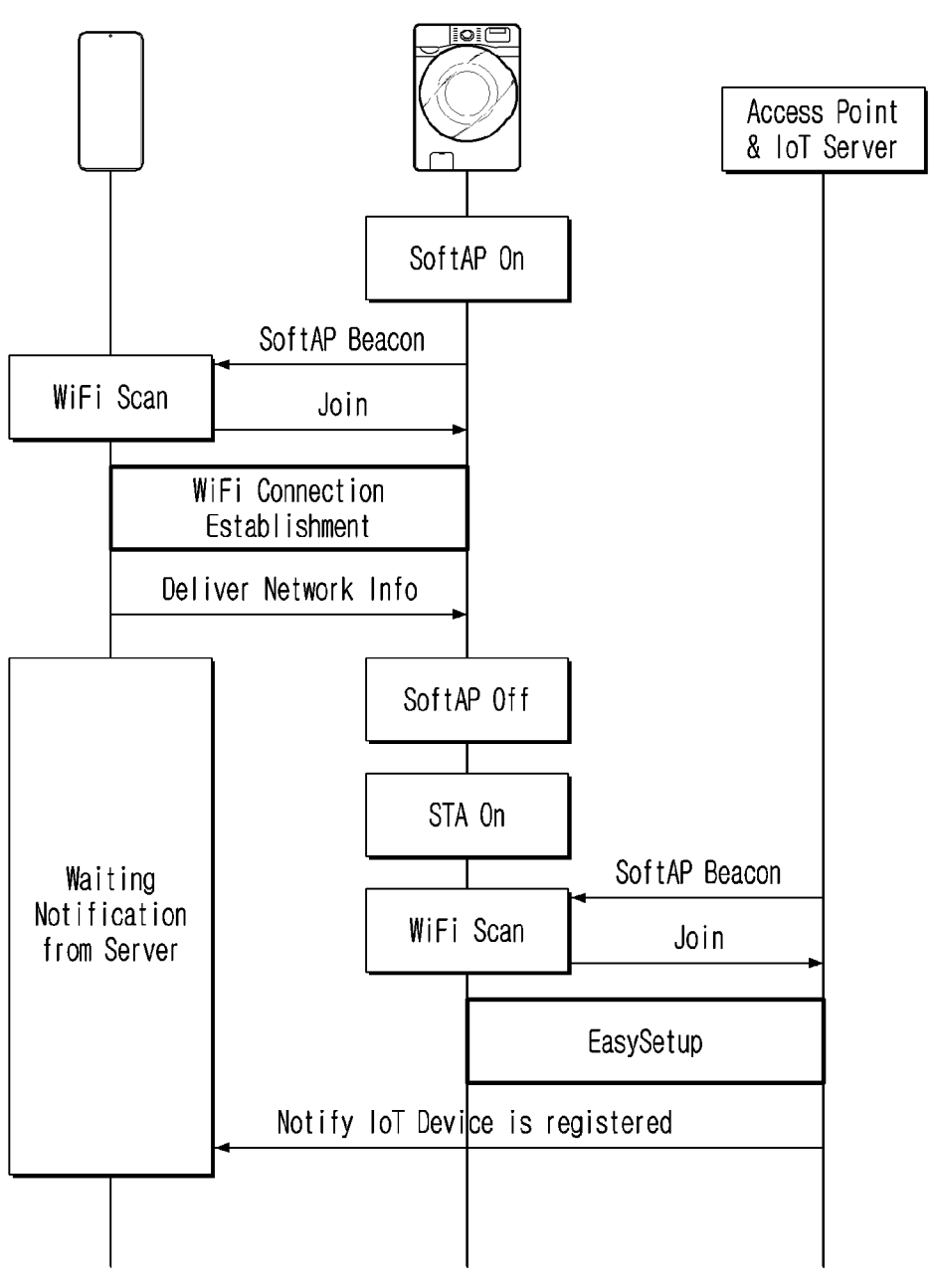
FIG. 1 is a diagram illustrating an Easy Setup operation according to one or more embodiments.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

An object of the disclosure is in providing an electronic apparatus and a user terminal device for re-performing a whole operation or a portion of the operation of an Easy Setup according to a communication connection being released after the Easy Setup, and control methods thereof.

Example embodiments of the disclosure will be described in detail below with reference to the accompanying drawings.

Terms used in one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A or B is to be understood as indicating only "A," only "B," or both "A and B."

Expressions such as "first," "second," "1st," "2nd," and so on used herein may be used to refer to various elements regardless of order and/or importance, and it should be noted that the expressions are merely used to distinguish an element from another element and not to limit the relevant elements.

A singular expression includes a plural expression, unless otherwise specified. In the disclosure, it is to be understood that terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or a device (e.g., artificial intelligence electronic apparatus) using an electronic apparatus.

Various embodiments of the disclosure will be described in greater detail below with reference to the accompanied drawings.

FIG. 1 is a diagram illustrating an Easy Setup operation according to one or more embodiments.

Internet of things (IoT) devices may be limited in terms of user input since there are many instances in which a touch screen is not provided compared to other devices such as a smartphone. Accordingly, there is a problem of users having difficulty in joining the IoT devices to the internet.

As a method for solving this problem, an Easy Setup operation may be a method for joining an IoT device to the internet using a smartphone and concurrently registering the IoT device in an IoT server, which may be referred to as onboarding or commissioning. A device that assists onboarding such as a smartphone and a smart television (TV) may be referred to as an onboarding helper or a commissioner.

For example, the IoT device (e.g., shown as a washer in FIG. 1 for convenience of description) may automatically change, as shown in FIG. 1, a Wi-Fi state to a soft access point state, while in an out of box experience (OOBE) state. In the soft access point state, the IoT device may transmit a beacon to a specific SSID (Soft AP beaconing). A smartphone may form a device to device (D2D) communication channel between the smartphone and the IoT device by scanning the specific service set identifier (SSID) and joining a communication session with the IoT device. The smartphone may transmit information (SSID/Passphrase/join type, etc. of an access point) required in the onboarding to the IoT device through the D2D channel. In one or more examples, a soft access point may be a software enabled access point that utilize software to enable a device or computer to operate as an access point.

The IoT device may turn off the soft access point when the information required in the onboarding is received from the smartphone. The IoT device may perform a Wi-Fi scan by turning on a station mode, and connect to the access point based on the information received from the smartphone. The IoT device may register the IoT device in the IoT server for an IoT service, and form a device to server (D2S) communication channel between the IoT device and the IoT server.

The smartphone may receive a registration complete notification from the IoT server after completing a D2D channel.

In the above description, an example of the IoT device operating as the soft access point for the D2D channel has been described. However, as understood by one of ordinary skill in the art, this description is non-limiting, and the IoT device may perform Bluetooth Low Energy (BLE) advertising.

As described above, after an initial Easy Setup operation, D2D joining may no longer be required or may not be able to join an access point. For example, the IoT device may stop Soft AP beaconing and BLE advertising after the initial Easy Setup operation.

However, the Easy Setup operation may be required again for reasons such as changing of the access point and releasing an access point. In one or more examples, a user may perform the Easy Setup operation again through a method of turning on a D2D communication function after the D2D communication function is turned off. For example, the user may operate an input button provided in the IoT device for the IoT device to perform the Soft AP beaconing or the BLE advertising, and control the IoT device to perform the Easy Setup operation described above.

However, re-performing the Easy Setup operation is difficult for the user because the user has no knowledge of the series of operations described above.

Figure 2:
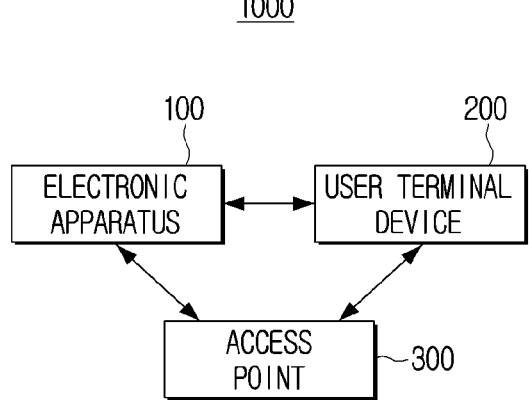
FIG. 2 is a block diagram illustrating a display system according to one or more embodiments.

FIG. 2 is a block diagram illustrating a display system 1000 according to one or more embodiments. As shown in FIG. 2, the display system 1000 may include an electronic apparatus 100, a user terminal device 200, and an access point 300.

The electronic apparatus 100 may, as an IoT device, be a device that is joined to the access point 300 by assistance of the user terminal device 200. For example, the electronic apparatus 100 may be a washer, a refrigerator, a freezer, a dishwasher, a robot cleaner, or any other device known to one of ordinary skill in the art that may connect to the Internet.

The electronic apparatus 100 may perform, based on a communication connection with the access point 300 being released, a scan for rejoining with the access point 300, and operate as the soft access point based on a signal including identification information of the electronic apparatus 100 being received from the user terminal device 200. After receiving the signal including the identification information, the electronic apparatus 100 may be rejoined, based on operating as the soft access point, to the access point 300 due to the Easy Setup operation being re-performed as described above.

The user terminal device 200 may, as a device that performs the Easy Setup operation, include a display, and may be a device that assists the electronic apparatus 100 to be joined or re-joined to the access point 300. For example, the user terminal device 200 may be a smartphone a tablet personal computer (PC), a desktop PC, a notebook, a TV, or any other device known to one of ordinary skill in the art that includes a display an may be connected to the Internet. However, the user terminal device is not limited thereto, and the user terminal device 200 may be any device known to one of ordinary skill in the art that is configured to perform the Easy Setup operation.

The user terminal device 200 may perform, based on a determination the communication connection between the electronic apparatus 100 and the access point 300 is released, broadcasting of the signal including the identification information of the electronic apparatus 100. In one or more examples, the user terminal device 200 may guide, based on a determination the communication connection between the electronic apparatus 100 and the access point 300 is released, the user of the communication connection having been released, and the user terminal device 200 may further perform broadcasting of the signal including the identification information of the electronic apparatus 100 when a user command for rejoining the electronic apparatus 100 to the access point 300 is received. In one or more examples, the user terminal device 200 may store the identification information of the electronic apparatus 100 in an initial Easy Setup operation.

The user terminal device 200 may re-perform, based on the electronic apparatus operating as the soft access point, the Easy Setup operation for the electronic apparatus 100 to be rejoined to the access point 300.

Through the operations of the electronic apparatus 100 and the user terminal device 200 as described above, the user may re-perform the Easy Setup operation without controlling the electronic apparats 100 or re-perform the Easy Setup operation by controlling the user terminal device 200.

The access point 300 may be a device that assists a device configured to perform wireless communication to join a network.

In one or more examples, an operation of re-performing the Easy Setup operation may include a whole operation as shown in FIG. 1. However, the operation is not limited thereto, and the operation of re-performing the Easy Setup operation may include a portion of the operation from among the whole operation of FIG. 1 or an operation that modifies this portion from among the whole operation in FIG. 1. For example, the electronic apparatus 100 may be released from a communication connection with the access point 300 if a password or the SSID of the access point 300 is changed, perform scanning for rejoining with the access point 300, and operate as the soft access point if the signal including the identification information of the electronic apparatus 100 is received from the user terminal device 200. After a rejoining process is initiated, the user terminal device 200 may provide, based on the electronic apparatus 100 operating as the soft access point, a changed password or a changed SSID of the access point 300 to the electronic apparatus 100. The electronic apparatus 100 may be rejoined to the access point 300 based on the changed password or the changed SSID of the access point 300.

However, the operation is not limited these actions or configurations, and the operation of re-performing the Easy Setup operation may be a process that includes all of the various interactions of the electronic apparatus 100 and the user terminal device 200 for rejoining the electronic apparatus 100 to the access point 300.

In FIG. 2, the electronic apparatus 100 has been shown as being joined to the access point 300. The electronic apparatus 100 may also be joined to the IoT server through the access point 300. However, for convenience of description below, the electronic apparatus 100 will be described as being joined to the access point 300.

Figure 3:
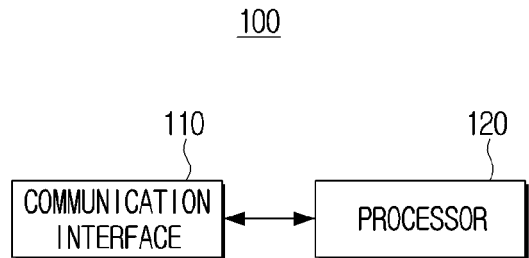
FIG. 3 is a block diagram illustrating a configuration of an electronic apparatus according to one or more embodiments.

FIG. 3 is a block diagram illustrating a configuration of the electronic apparatus 100 according to one or more embodiments. Referring to FIG. 3, the electronic apparatus 100 may include a communication interface 110 and a processor 120.

The communication interface 110 may be a configuration that performs communication with an external device of various types according to communication methods of various types. For example, the electronic apparatus 100 may perform communication with the user terminal device 200 or the access point 300 through the communication interface 110.

The communication interface 110 may include a Wi-Fi module, a Bluetooth module, an infrared communication module, a wireless communication module, or any other suitable communication interface known to one of ordinary skill in the art. In one or more examples, each communication module or interface may be implemented in at least one hardware chip form.

The Wi-Fi module and the Bluetooth module may perform communication in a Wi-Fi method and a Bluetooth method, respectively. When using the Wi-Fi module or the Bluetooth module, various joining information such as a service set identifier (SSID) and a session key may first be transmitted and received, and after communicatively joining using the same, various information may be transmitted and received. The SSID may an identifier of an electronic apparatus. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), or any other communication method known to one of ordinary skill in the art, in addition to the above-described communication methods.

In one or more examples, the communication interface 110 may include a wired communication interface such as, for example, and without limitation, HDMI, DP, Thunderbolt, USB, RGB, D-SUB, DVI, or any other suitable wired communication interface known to one of ordinary skill in the art.

In addition thereto, the communication interface 110 may include at least one from among the wired communication modules that perform communication using a local area network (LAN) module, an Ethernet module, or a pair cable, a coaxial cable or an optical fiber cable, or any other communication interface module known to one of ordinary skill in the art.

As understood by one of ordinary skill in the art, the communication interface 110 may be implemented as one communication interface or implemented as a plurality of communication interfaces. However, for convenience of description below, an operation of the electronic apparatus 100 will be described using the expression communication interface 110.

The processor 120 may control the overall operation of the electronic apparatus 100. In one or more examples, the processor 120 may control the overall operation of the electronic apparatus 100 by being joined with each configuration of the electronic apparatus 100. For example, the processor 120 may be joined with configurations such as the communication interface 110, a display, and a memory, and control an operation of the electronic apparatus 100.

According to one or more embodiments, the processor 120 may be implemented as a digital signal processor (DSP), a microprocessor, or a time controller (TCON). However, the embodiments are not limited to these configurations or devices, and may include one or more from among a central processing unit (CPU), a micro controller unit (MCU), a micro processing unit (MPU), a controller, an application processor (AP), a communication processor (CP), or an ARM processor, or may be defined by the corresponding term. In one or more examples, the processor 120 may be implemented as a System on Chip (SoC) or a large scale integration (LSI) embedded with a processing algorithm, and may be implemented in the form of a field programmable gate array (FPGA).

As understood by one of ordinary skill in the art, the processor 120 may be implemented as one processor or implemented as a plurality of processors. However, for convenience of description below, an operation of the electronic apparatus 100 will be described using the expression processor 120.

The processor 120 may be joined to the access point 300 through the Easy Setup operation by the user terminal device 200.

The processor 120 may control, based on the communication connection with the access point 300 being released, the communication interface 110 to perform scanning for rejoining with the access point 300. For example, the processor 120 may be released from the communication connection with the access point 300 for reasons such as changing of the access point 300 or changing of authentication credentials such as a password. When the communication connection is released, the processor 120 may control the communication interface 110 to perform scanning for rejoining with the access point 300. The processor 120 may stop the scanning operation when rejoining with the access point 300 is performed, or maintain the scanning operation when rejoining with the access point 300 is not performed.

The processor 120 may control, based on the signal including the identification information of the electronic apparatus 100 being received from the user terminal device 200 through the communication interface 110, the communication interface 110 to operate as the soft access point. For example, the user terminal device 200 may receive information that the communication connection of the electronic apparatus 100 has been released from the IoT server. In one or more examples, the user terminal device 200 may identify, based on the scanning operation of the electronic apparatus 100 being continued for greater than or equal to a pre-set time, that the communication connection of the electronic apparatus 100 and the access point has been released. When it is determined that the communication connection is released, the user terminal device 200 may perform broadcasting of the signal including the identification information of the electronic apparatus 100. In one or more examples, the user terminal device 200 may perform broadcasting of a Wi-Fi beacon frame or a BLE advertising packet that includes the identification information of the electronic apparatus 100.

The processor 120 may control the communication interface 110 to receive the broadcasted Wi-Fi beacon frame or the BLE advertising packet from the user terminal device 200 through the communication interface 110, and operate as the soft access point based on the Wi-Fi beacon frame or the BLE advertising packet including the identification information of the electronic apparatus 100.

The processor 120 may control the communication interface 110 to receive information about the access point 300 from the user terminal device 200 through the communication interface 110, and transmit a rejoining request to the access point 300 based on the information about the access point 300. For example, the user terminal device 200 may form, based on the electronic apparatus 100 operating as the soft access point, a D2D communication channel with the electronic apparatus 100, and transmit information about the access point 300 to the electronic apparatus 100. The processor 120 may turn off the soft access point if the information about the access point 300 is received, and reconnect to the access point 300 based on the information about the access point 300.

Figure 4:
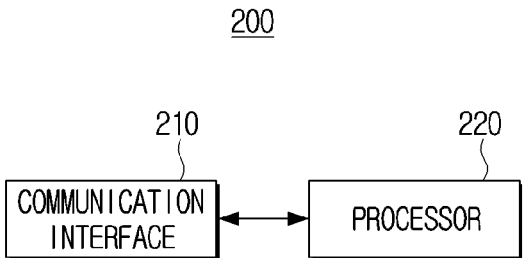
FIG. 4 is a block diagram illustrating a configuration of a user terminal device according to one or more embodiments.

FIG. 4 is a block diagram illustrating a configuration of the user terminal device 200 according to one or more embodiments. Referring to FIG. 4, the user terminal device 200 may include a communication interface 210 and a processor 220.

The communication interface 210 may be configured to perform communication with external devices of various types according to communication methods of various types. For example, the user terminal device 200 may perform communication with the electronic apparatus 100 or the access point 300 through the communication interface 210.

The communication interface 210 may include a Wi-Fi module, a Bluetooth module, an infrared communication module, a wireless communication module, or any other communication module known to one of ordinary skill in the art. In one or more examples, each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received, and after communicatively joining using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), or any other communication method known to one of ordinary skill in the art, in addition to the above-described communication methods.

In one or more examples, the communication interface 210 may include a wired communication interface such as, for example, and without limitation, HDMI, DP, Thunderbolt, USB, RGB, D-SUB, DVI, or any other wired communication interface known to one of ordinary skill in the art.

In one or more examples, the communication interface 210 may include at least one from among the wired communication modules that perform communication using the local area network (LAN) module, the Ethernet module, or the pair cable, the coaxial cable or the optical fiber cable, or any other wired communication module known to one of ordinary skill in the art.

As understood by one of ordinary skill in the art, the communication interface 210 may be implemented as one communication interface or implemented as the plurality of communication interfaces. However, for convenience of description below, an operation of the user terminal device 200 will be described using the expression communication interface 210.

The processor 220 may control the overall operation of the user terminal device 200. In one or more examples, the processor 220 may control the overall operation of the user terminal device 200 by being joined with each configuration of the user terminal device 200. For example, the processor 220 may be joined with configurations such as the communication interface 210, the memory, the display, and a user interface and control an operation of the user terminal device 200.

According to one or more embodiments, the processor 220 may be implemented as the digital signal processor (DSP), the microprocessor, or the time controller (TCON). However, as understood by one of ordinary skill in the art, the embodiments are not limited to these configurations or circuitry, and may include one or more from among the central processing unit (CPU), the micro controller unit (MCU), the micro processing unit (MPU), the controller, the application processor (AP), the communication processor (CP), or the ARM processor, or may be defined by the corresponding term. In one or more examples, the processor 220 may be implemented as the System on Chip (SoC) or the large scale integration (LSI) embedded with a processing algorithm, and may be implemented in the form of a field programmable gate array (FPGA).

As understood by one of ordinary skill in the art, the processor 220 may be implemented as one processor or implemented as the plurality of processors. However, for convenience of description below, an operation of the user terminal device 200 will be described using the expression processor 220.

The processor 220 may form, through the Easy Setup operation, the communication connection of the electronic apparatus 100 and the access point 300.

For example, the electronic apparatus 100 may further include a memory, and the processor 220 may obtain the identification information of the electronic apparatus 100 while performing the Easy Setup operation for communication connection, and store the identification information of the electronic apparatus 100 in the memory.

The processor 220 may control, based on a determination that a communication connection between the electronic apparatus 100 and the access point 300 is released, the communication interface 210 to perform broadcasting of the signal including the identification information of the electronic apparatus 100 stored in the memory.

For example, the processor 220 may control, based on the determination that the communication connection between the electronic apparatus 100 and the access point 300 is released, the communication interface 210 to perform broadcasting of the Wi-Fi beacon frame or the BLE advertising packet that includes the identification information of the electronic apparatus 100.

The processor 220 may control the communication interface 210 to perform broadcasting of the signal for a threshold time, and identify whether the electronic apparatus 100 is operated as the soft access point when the threshold time has passed. The processor 220 may control the communication interface 210 to transmit information about the access point 300 to the electronic apparatus 100 if the electronic apparatus 100 is operated as the soft access point, and repeat broadcasting of the signal if the electronic apparatus 100 is not operated as the soft access point.

The processor 220 may control, based on a determination the electronic apparatus 100 is operating as the soft access point, the communication interface 210 to transmit the information about the access point 300 to the electronic apparatus 100. The electronic apparatus 100 may re-connect to the access point 300 based on the information about the access point 300. For example, the Easy Setup operation may be re-performed, where user convenience is advantageously improved according to the Easy Setup operation being re-performed without user intervention.

In the above description, the processor 220 has been described as automatically re-performing the Easy Setup operation based on the determination the communication connection between the electronic apparatus 100 and the access point 300 is released, but is not limited thereto. For example, the user terminal device 200 may further include a display and a user interface, and the processor 220 may control, based on a determination the communication connection between the electronic apparatus 100 and the access point 300 is released, the display to display a message indicating that the communication connection has been released, and control, based on receiving, through the user interface, a user command for rejoining the electronic apparatus 100 to the access point 300, the communication interface 210 to perform broadcasting of the signal including the identification information of the electronic apparatus 100. For example, the Easy Setup operation may be re-performed based on control by the user, and the user may re-perform the Easy Setup operation through the user terminal device 200 that has a higher usability than the electronic apparatus 100 and thereby, provide the user with choices while improving user convenience.

The processor 220 may identify a communication connection state of the electronic apparatus 100 and the access point 300 when a pre-set application is executed or at pre-set time intervals. For example, the processor 220 may identify, based on an application for controlling the IoT devices including the electronic apparatus 100 being executed, the communication connection state of the IoT devices registered in the application. In one or more examples, the processor 220 may identify the communication connection state of the electronic apparatus 100 and the access point 300 at pre-set time intervals.

FIG. 5 is a block diagram illustrating a detailed configuration of the user terminal device 200 according to one or more embodiments. The user terminal device 200 may include the communication interface 210 and the processor 220. In one or more examples, referring to FIG. 5, the user terminal device 200 may further include a memory 230, a display 240, a user interface 250, a microphone 260, a speaker 270, and a camera 280. Detailed description of parts that overlap with the elements shown in FIG. 4 from among the elements shown in FIG. 5 will be omitted.

The memory 230 may refer to a hardware that stores information such as data in electric or magnetic form for the processor 220 and the like to access. For example, the memory 230 may be implemented as at least one hardware from among a non-volatile memory, a volatile memory, a flash memory, a hard disk drive (HDD) or a solid state drive (SSD), a random access memory (RAM), a read only memory (ROM), or any other memory structure known to one of ordinary skill in the art.

In the memory 230, at least one instruction required in an operation of the user terminal device 200 or the processor 220 may be stored. For example the instruction may be a code unit that instructs an operation of the user terminal device 200 or the processor 220, and may be prepared in a machine language which is a language that may be understood by a computer. In one or more examples, the memory 230 may be stored with a plurality of instructions that perform a specific work of the user terminal device 200 or the processor 220 as an instruction set.

The memory 230 may be stored with data which is information in a bit or byte unit that may represent a character, a number, an image, and the like. For example, the memory 230 may be stored with information about the electronic apparatus 100, information about the access point 300, or any other suitable information.

The memory 230 may be accessed by the processor 220 and reading, writing, modifying, deleting, updating, and the like of the instruction, the instruction set, or data may be performed by the processor 220.

The display 240 may be a configuration that displays an image, and implemented as a display of various forms such as a liquid crystal display (LCD), an organic light emitting diode (OLED) display, and a plasma display panel (PDP). In the display 240, a driving circuit, which may be implemented in the form of an a-si TFT, a low temperature poly silicon (LTPS) TFT, an organic TFT (OTFT), or any other TFT structure known to one of ordinary skill in the art, a backlight unit, or any other backlight structure known to one of ordinary skill in the art may be included. The display 240 may be implemented as a touch screen coupled with a touch sensor, a flexible display, a three-dimensional display (3D display), or any other display structure known to one of ordinary skill in the art.

The user interface 250 may be implemented as a button, a touch pad, a mouse, a keyboard, or any other input device known to one of ordinary skill in the art, or implemented also as a touch screen configured to perform a display function and an operation input function together therewith. In one or more examples, the button may be a button of various types such as a mechanical button, a touch pad, or a wheel which is formed at a random area at a front surface part or a side surface part, a rear surface part, or the like of an exterior of a main body of the user terminal device 200.

The microphone 260 may be a configuration for receiving sound and converting to an audio signal. The microphone 260 may be electrically joined with the processor 220, and may receive sound by the control of the processor 220.

For example, the microphone 260 may be formed as an integrated-type integrated to an upper side or a front surface direction, a side surface direction or any other suitable direction of the user terminal device 200. In one or more examples, the microphone 260 may be provided in a remote controller, or the like separate from the user terminal device 200. In one or more examples, the remote controller may receive sound through the microphone 260, and provide the received sound to the user terminal device 200.

The microphone 260 may include various configurations such as a microphone that collects sound of an analog form, an amplifier circuit that amplifies the collected sound, an A/D converter circuit that samples the amplified sound and converts to a digital signal, a filter circuit that removes noise components from the converted digital signal, or any other suitable configuration known to one of ordinary skill in the art.

The microphone 260 may be implemented in a form of a sound sensor, and may be any method so long as it is a configuration that may collect sound.

The speaker 270 may be an element that outputs not only various audio data processed in the processor 220, but also various notification sounds, voice messages, or any other suitable audio data.

In addition thereto, the user terminal device 200 may further include the camera 280. The camera 280 may be configured to capture a still image or a moving image. The camera 280 may capture the still image at a specific time point. In one or more examples, the camera 280*t* may be configured to capture one or more still images consecutively.

As described above, after the communication connection with the access point 300 has been released, the electronic apparatus 100 may operate as the soft access point and re-perform the Easy Setup operation based on receiving the signal including the identification information of the electronic apparatus 100 from the user terminal device 200, thereby improving user convenience.

An operation of the electronic apparatus 100 and the user terminal device 200 will be described in greater detail below through FIG. 6 to FIG. 9. In FIG. 6 to FIG. 9, individual embodiments will be described for convenience of description. However, the individual embodiments of FIG. 6 to FIG. 9 may be realized or achieved in any combined state.

FIG. 6 is a diagram illustrating a screen of an application that manages IoT devices according to one or more embodiments. In FIG. 6, for convenience of description, the electronic apparatus 100 is described as the washer. The screen displayed in FIG. 6 may be displayed on a user terminal device 200 such as a smartphone.

The processor 220 of the user terminal device 200 may display, based on an application that manages the IoT devices being executed, a screen (600A) as shown in a left side of FIG. 6. For example, the processor may identify, based on the application being executed, the communication connection state of the IoT devices such as the washer and dryer, and display that the washer and dryer which are to be displayed on a screen are in an offline state.

If the user selects a graphical user interface (GUI) 610 corresponding to the washer, the processor 220 may display a screen that includes detailed information about the washer as shown in a middle section of FIG. 6 (600B). In one or more examples, the detailed information about the washer may include a GUI 620 that provides a connection state of the washer, previous operation information, and a setting menu for the washer.

If the user selects the GUI 620 that provides the setting menu for the washer, the processor 220 may provide a detailed setting menu as shown at a right side of FIG. 6 (600C). For example, the specific setting menu may include a user guide, a select country/region, information, a home care manager, and a perform rejoining 630. In one or more examples, when it is determined that the connection between an electronic apparatus and an access point is released, the perform rejoining 630 may automatically appear on a display of a user terminal.

If the user selects the perform rejoining 630, the processor 220 may perform broadcasting of the SSID including information which may specify the washer (e.g., serial number) or the Wi-Fi beacon frame or the BLE advertising packet having vendor-specific fields. In one or more examples, the Wi-Fi beaconing may be required when performing a tethering function in the smartphone, and is a function supported by user terminals such as smartphones.

The washer may continuously perform, based on release of the communication connection with the access point 300, scanning for rejoining with the access point 300. When the communication connection between the washer and access point 300 is released, the washer may change to a state configured to rejoin the communication connection based on the user terminal device 200 receiving the broadcasted Wi-Fi beacon frame or the BLE advertising packet, and starting the Soft AP beaconing or the BLE advertising when information specifying the washer is identified therefrom.

In one or more examples, the washer and the user terminal device 200 may re-perform the Easy Setup operation through the process as shown in FIG. 1.

In FIG. 6, the user terminal device 200 has been described as assisting in the rejoining of the electronic apparatus 100 according to control by the user, however, as understood by one of ordinary skill in the art, the embodiments are not limited to these configurations. For example, the user terminal device 200 may identify the communication connection state of the electronic apparatus 100 periodically, and assist in the rejoining of the electronic apparatus 100 without user control when communication connection of the electronic apparatus 100 has been released.

Figure 7:
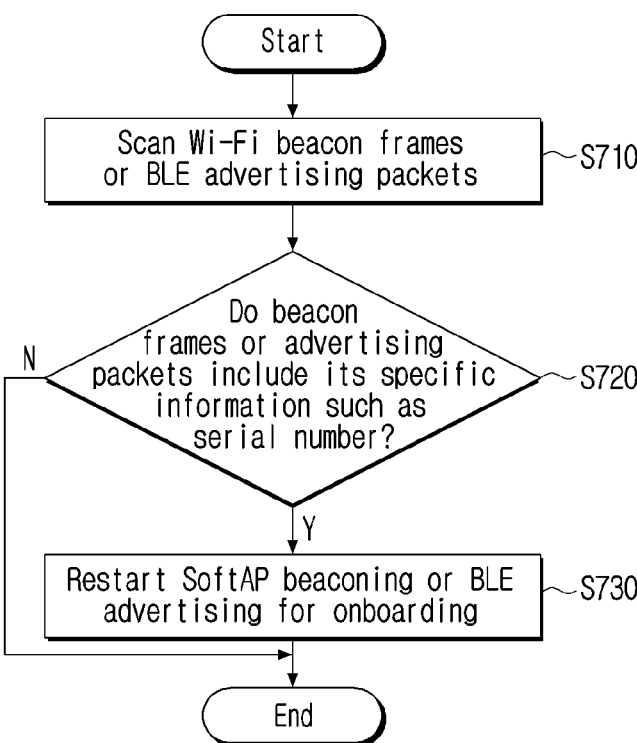
FIG. 7 is a flowchart illustrating an operation of an electronic apparatus after communication connection is released according to one or more embodiments.

FIG. 7 is a flowchart illustrating an operation of the electronic apparatus 100 after communication connection is released according to one or more embodiments. The process illustrated in FIG. 7 may be initiated when it is determined that a communication connection between an electronic apparatus 100 and an access point 300 is released.

The processor 120 of the electronic apparatus 100 may continuously perform, based on a determination the communication connection of the access point 300 is released, scanning for rejoining with the access point 300. For example, the processor 120 may continuously perform scanning of the Wi-Fi beacon frames or the BLE advertising packets (S710). In one or more examples, the processor 120 may scan the Wi-Fi beacon frames and the BLE advertising packets simultaneously.

The processor 120 may identify, based on receiving the Wi-Fi beacon frames or the BLE advertising packets broadcasted by the user terminal device 200, whether the Wi-Fi beacon frames or the BLE advertising packets are included in the information specifying the electronic apparatus 100 (e.g., serial number) (S720).

The processor 120 may perform the Soft AP beaconing or the BLE advertising when the Wi-Fi beacon frames or the BLE advertising packets include the information specifying the electronic apparatus 100 (S730), and maintain the scanning operation when the Wi-Fi beacon frames or the BLE advertising packets do not include the information which can specify the electronic apparatus 100.

For example, the electronic apparatus 100 may re-perform, based on the Wi-Fi beacon frames or the BLE advertising packets that are broadcasted from the user terminal device 200 including information specifying the electronic apparatus 100, the Easy Setup operation by performing the Soft AP beaconing or the BLE advertising. In one or more examples, re-performing the Easy Setup operation may be possible without the user having to operate the electronic apparatus 100.

Figure 8:
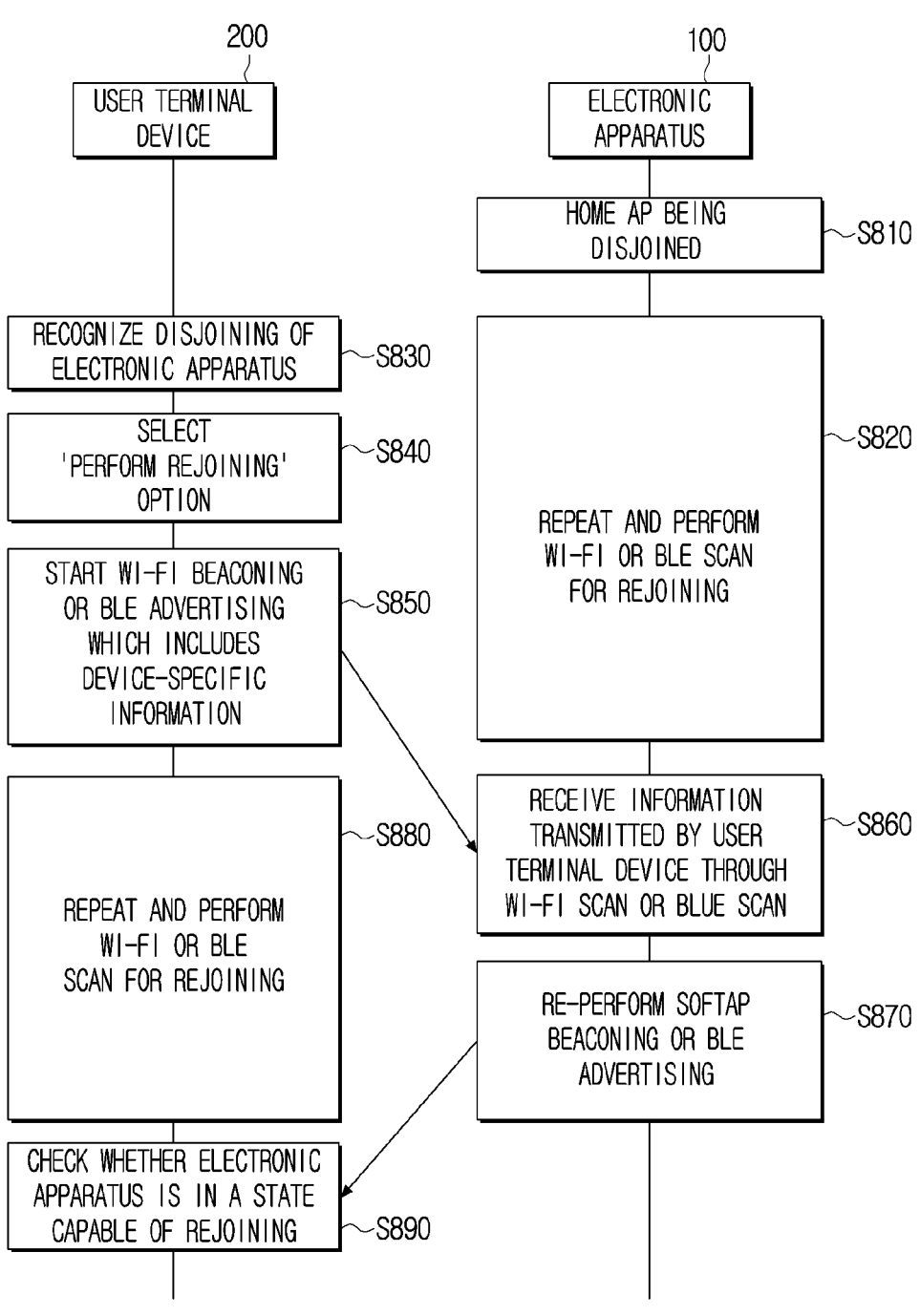
FIG. 8 is a sequence diagram illustrating a re-performance of an Easy Setup operation according to one or more embodiments.

FIG. 8 is a sequence diagram illustrating a re-performance operation of an Easy Setup operation according to one or more embodiments.

The electronic apparatus 100 may be released from connection with the access point 300 (S810). In one or more examples, when the connection with the access point 300 is released, the electronic apparatus 100 may continuously perform scanning for rejoining with the access point 300 (S820).

The user terminal device 200 may identify release of the electronic apparatus 100 (S830), and provide the user with corresponding information. For examples, the user terminal device 200 may display a message indicating the connection between the electronic apparatus 100 and the access point 300 is released. The user terminal device 200 may perform, based on a 'perform rejoining' option being selected (S840), the Wi-Fi beaconing or the BLE advertising, which includes the identification information of the electronic apparatus 100 (e.g., device-specific information) (S850).

The electronic apparatus 100 may receive the Wi-Fi beacon frame or the BLE advertising packet broadcasted from the user terminal device 200 (S860), and perform the Soft AP beaconing or the BLE advertising when the identification information of the electronic apparatus 100 is included in the received information (S870).

The user terminal device 200 may repeat performing a Wi-Fi or BLE scan (S880) for a pre-set time. If the electronic apparatus 100 performs the Soft AP beaconing or the BLE advertising, the user terminal device 200 may check, through a scan, whether the electronic apparatus 100 is in a state capable of rejoining the connection with the access point (S890), and re-perform the Easy Setup operation. In one or more examples, the user terminal device 200 may repeat and perform, based on not being able to check whether the electronic apparatus 100 is in a state capable of joining through the scan, the Wi-Fi beaconing or the BLE advertising, which includes the identification information of the electronic apparatus 100.

Figure 9:
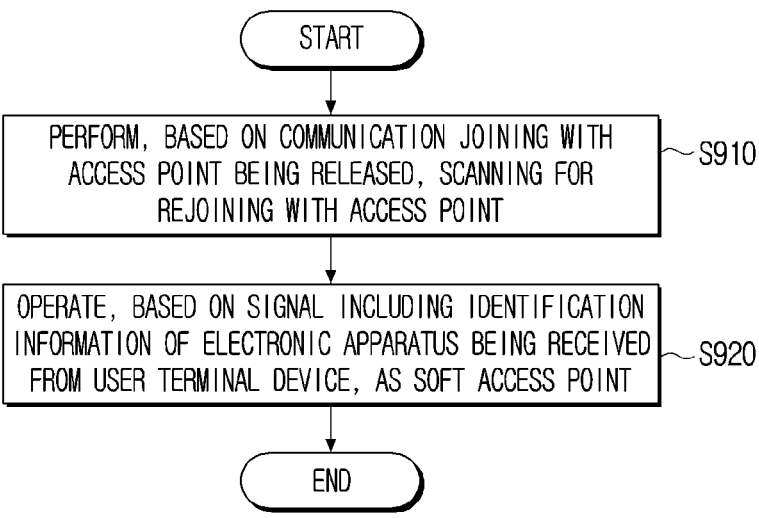
FIG. 9 is a flowchart illustrating a control method of an electronic apparatus according to one or more embodiments.

FIG. 9 is a flowchart illustrating a control method of an electronic apparatus according to one or more embodiments. The process illustrated in FIG. 9 may be performed by the electronic apparatus 100.

When the communication connection with the access point is released, scanning for rejoining with the access point may be performed (S910). When the signal including the identification information of the electronic apparatus is received from the user terminal device, the electronic apparatus may operate as the soft access point (S920).

In one or more examples, receiving information about the access point from the user terminal device and transmitting the rejoining request to the access point based on the information about the access point may be further included.

In operation (S920), the electronic apparatus may operate as the soft access point based on receiving the broadcasted Wi-Fi beacon frame or BLE advertising packet from the user terminal device, and the Wi-Fi beacon frame or the BLE advertising packet including the identification information of the electronic apparatus.

Figure 10:
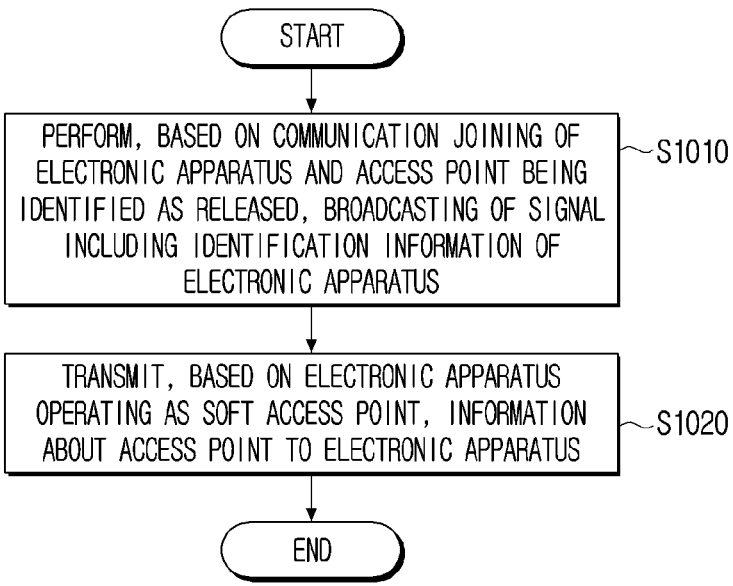
FIG. 10 is a flowchart illustrating a control method of a user terminal device according to one or more embodiments.

FIG. 10 is a flowchart illustrating a control method of a user terminal device according to one or more embodiments. The process illustrated in FIG. 10 may be performed by the user terminal device 200.

When a determination is made that the communication connection of the electronic apparatus and the access point is released, the signal including the identification information of the electronic apparatus may be broadcasted (S1010). After the signal is broadcasted, when the electronic apparatus is operated as the soft access point, the information about the access point may be transmitted to the electronic apparatus (S1020).

In one or more examples, the performing broadcasting (S1010) may include performing broadcasting of the signal for the threshold time, and identifying whether the electronic apparatus is operated as the soft access point based on the threshold time passing.

The performing broadcasting (S1010) may include re-performing broadcasting if the electronic apparatus is not operated as the soft access point, and the transmitting (S1020) may include transmitting the information about the access point to the electronic apparatus if the electronic apparatus is operated as the soft access point.

The performing broadcasting (S1010) may include performing, based on a determination the communication connection between the electronic apparatus and the access point is released, broadcasting of the Wi-Fi beacon frame or the BLE advertising packet including the identification information of the electronic apparatus.

In one or more examples, obtaining the identification information of the electronic apparatus while performing the Easy Setup operation for communication connection and storing the identification information of the electronic apparatus may be further included, and the performing broadcasting (S1010) may include performing, based on the determination the communication connection between the electronic apparatus and the access point is released, broadcasting of the signal including the stored identification information of the electronic apparatus.

The performing broadcasting (S1010) may include displaying, based on the determination the communication connection between the electronic apparatus and the access point is released, a message indicating that the communication connection has been released, and performing, based on the user command for rejoining the electronic apparatus to the access point being received, broadcasting of the signal including the identification information of the electronic apparatus.

In one or more examples, identifying the communication connection state of the electronic apparatus and the access point when a pre-set application is executed or at pre-set time intervals may be further included.

According to the various embodiments of the disclosure as described above, the electronic apparatus may operate, based on the signal including the identification information of the electronic apparatus being received from the user terminal device after the communication connection with the access point has been released, as the soft access point and re-perform the Easy Setup operation and thereby, user convenience may be improved.

The user terminal device may perform, based on the determination the communication connection between the electronic apparatus and the access point is as released, broadcasting of the signal including the identification information of the electronic apparatus and thereby, user convenience may be improved according to the electronic apparatus guiding to perform the Easy Setup operation.

According to one or more embodiments, the various embodiments described above may be implemented with software which includes instructions stored in a machine-readable storage medium (e.g., computer). The machine may call an instruction stored in the storage medium, and as a device operable according to the called instruction, may include an electronic apparatus (e.g., electronic apparatus (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments of the disclosure, the various embodiments described above may be implemented in a recordable medium which is readable by a computer or a device similar to the computer using software, hardware, or the combination of software and hardware. In some cases, embodiments described herein may be implemented by the processor on its own. According to a software implementation, embodiments such as the procedures and functions described herein may be implemented as separate software. Each software may perform one or more function and operation described herein.

The computer instructions for performing processing operations in the device according to the various embodiments described above may be stored in a non-transitory computer-readable medium. The computer instructions stored in this non-transitory computer-readable medium may cause a specific device to perform a processing operation of the device according to the above-described various embodiments when executed by a processor of the specific device. The non-transitory computer-readable medium may refer to a medium that stores data semi-permanently rather than storing data for a very short time, such as a register, a cache, a memory, or the like, and is readable by a device. Specific examples of the non-transitory computer-readable medium may include a compact disc (CD), a digital versatile disc (DVD), a hard disc, a Blu-ray disc, a USB, a memory card, a ROM, and the like.

In addition, each element (e.g., a module or a program) according to the various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity and perform the same or similar functions performed by each of the corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While the disclosure has been illustrated and described with reference to various embodiments thereof, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:
at least one communication interface; and
at least one processor operatively coupled with the at least one communication interface and configured to control the electronic apparatus,
wherein the at least one processor is further configured to:
based on a release of a communication connection with a first access point, control the at least one communication interface to perform scanning for rejoining with the first access point,
based on the scanning, receive a signal comprising identification information of the electronic apparatus from a user terminal device through the at least one communication interface; and
based on the reception of the signal comprising the identification information of the electronic apparatus, control the at least one communication interface to operate as a second access point.

2. The electronic apparatus of claim 1, wherein the at least one processor is further configured to, after the first access point is released and the at least one communication interface is controlled to operate as the second access point:
receive information about the first access point from the user terminal device through the at least one communication interface, and
control the at least one communication interface to transmit a rejoining request to the first access point based on the information about the first access point.

3. The electronic apparatus of claim 1, wherein the at least one processor is further configured to, after the first access point is released:

receive a broadcasted Wi-Fi beacon frame or Bluetooth Low Energy (BLE) advertising packet from the user terminal device through the at least one communication interface, and based on the Wi-Fi beacon frame or the BLE advertising packet comprising the identification information of the electronic apparatus, control the at least one communication interface to operate as the second access point.

4. The electronic apparatus according to claim 1, wherein the second access point is a soft access point.

5. A control method of an electronic apparatus, the control method comprising:

based on a release of a communication connection with a first access point, performing scanning for rejoining with the first access point;

based on the scanning, receiving a signal comprising identification information of the electronic apparatus from a user terminal device through at least one communication interface; and based on the reception of the signal comprising the identification information of the electronic apparatus, operating as a second access point.

6. The control method of claim 5, further comprising, after the first access point is released and the electronic apparatus is operating as the second access point:

receiving information about the first access point from the user terminal device; and transmitting a rejoining request to the first access point based on the information about the first access point.

7. The control method of claim 5, wherein the operating as the second access point comprises:

receiving a broadcasted Wi-Fi beacon frame or Bluetooth Low Energy (BLE) advertising packet from the user terminal device, and based on the Wi-Fi beacon frame or the BLE advertising packet comprising the identification information of the electronic apparatus, operating as the second access point.

8. The method according to claim 5, wherein the second access point is a soft access point.

* * * * *